Oct. 18, 1927.
W. C. BUCKNAM
1,645,893
WELDING AND CUTTING APPARATUS
Filed Sept. 1, 1922
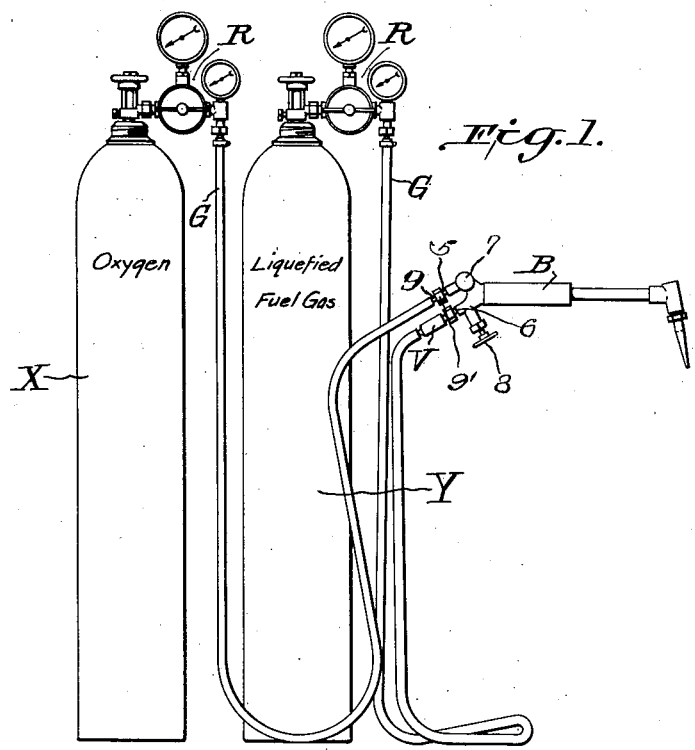
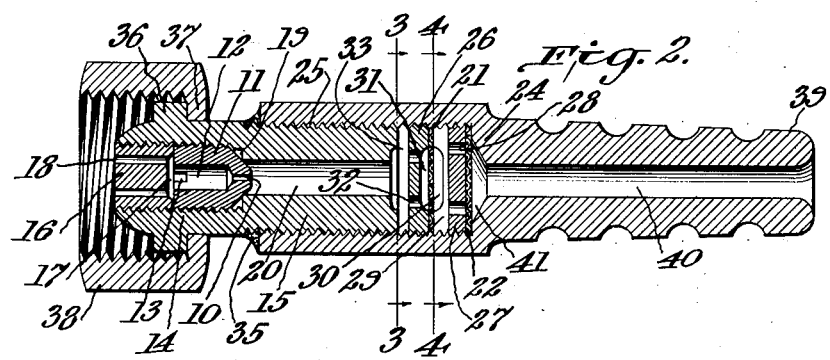
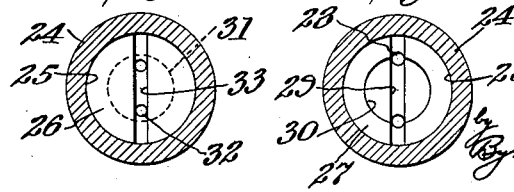

Patented Oct. 18, 1927.

1,645,893

UNITED STATES PATENT OFFICE.

WORTHY C. BUCKNAM, OF JERSEY CITY, NEW JERSEY, ASSIGNOR TO THE LINDE AIR PRODUCTS COMPANY, A CORPORATION OF OHIO.

WELDING AND CUTTING APPARATUS.

Application filed September 1, 1922. Serial No. 585,787.

This invention relates to welding and cutting apparatus and more particularly to an improved gas vaporizing and pressure reducing device adapted for attachment to metal welding and cutting blowpipes which receive the fuel gas employed therein from a supply of liquefied fuel gas maintained under pressure in a suitable reservoir, such as the usual gas storage cylinder. It will be understood, however, that the improved vaporizing and pressure reducing device may also be used in conjunction with other types of burners employing such liquefied fuel gas.

Liquefied fuel gas when used as a source of fuel gas for metal cutting and welding blowpipes now in general use may produce pressure fluctuations which are objectionable. It is thought that when the liquefied fuel gas vaporizes, especially upon withdrawing gas from a freshly charged cylinder, minute particles of unvaporized liquefied gas are carried along with the vaporized gas through the usual pressure regulating valve on the cylinder to the burner or blowpipe where they finally vaporize and produce variations in the mixture proportions and fluctuations in the gas pressure.

The primary object of this invention is to provide a comparatively inexpensive means for reducing such fluctuations to a point where they will not be of any consequence in the operation of the blowpipe or burner. A further object of the invention is to provide a simple attachment which may be coupled directly to the usual metal cutting or welding blowpipe, such attachment including a hose coupling to which the usual gas hose may be readily secured.

The above and other objects and the novel features of this invention will be apparent from the following description taken in connection with the drawings, in which Fig. 1 is a view of an improved apparatus embodying the present invention;

Fig. 2 is an enlarged longitudinal sectional view of a vaporizing device embodying this invention; and Figs. 3 and 4 are respectively transverse sectional views of the improved vaporizer, taken on the lines 3—3 and 4—4 of Fig. 2.

The burner for utilizing liquefied fuel gas may be of any suitable type, and as illustrated in Fig. 1 may be a metal cutting or welding blowpipe B of the usual or any preferred type which is provided with an oxygen inlet 5 and a fuel gas inlet 6 respectively controlled by valves 7 and 8, in a well known manner. The supplies of oxidizing gas such as oxygen and fuel gas such as acetylene have heretofore been conducted to the blowpipe from suitable cylinders of compressed oxygen and compressed acetylene by means of separate gas hoses G secured to the inlets 5 and 6 by hose couplings and coupling nuts such as the coupling 9 and nut 9'. The regulation of the pressures of the oxygen and acetylene is effected by separate pressure regulating valves R of a well known type carried by the oxygen and acetylene cylinders, and the valves 12 and 13 are employed to shut off the flow of gas at the blowpipe without changing the adjustment of these regulators, which normally deliver the gas from the cylinders to the burner supply pipe at a substantially constant pressure. According to the present invention these pressure regulating valves R on the cylinders X and Y, of oxygen and liquefied fuel gas respectively and the valves 7 and 8 are retained as parts of the apparatus but have been found to be insufficient to prevent the pressure fluctuations and variations in mixture proportions when liquefied fuel gas such as pyrogen is employed as the source of fuel gas instead of compressed gas such as acetylene.

In addition to the equipment as at present used in metal cutting and welding apparatus for example, a vaporizing and pressure reducing device or valve V is inserted in the fuel gas line between the pressure regulating valve on the liquefied fuel gas cylinder and the fuel gas needle valve 8 on the burner or blowpipe. This vaporizer V is designed to receive gas from the low-pressure side of the usual regulating valve, vaporize any unvaporized liquid gas and reduce the pressure of the gas supplied to a constant fraction of its initial value, thus greatly reducing pressure fluctuations at the blowpipe orifice. According to this invention the vaporizer V is embodied in an attachment for the blowpipe that also comprises a hose coupling.

As best shown in Fig. 2 the improved vaporizer comprises a restricted but permanently open orifice 10 that is adapted to vaporize liquid particles and reduce the pressure of the gas from the main supply to a constant fraction of its initial value. This orifice is desirably disposed in the axis of a threaded plug 11 and its low pressure side opens into a chamber 12 in the said plug. The plug 11 is provided with suitable means such as a slot 13 whereby it may be screwed into a threaded socket 14 in the vaporizer body 15. The socket may be closed by a second threaded plug 16 provided with a recess 17 at its inner end and one or more gas passages 18 communicating with the said recess but out of line with the chamber 12.

The end of the plug 11 that contains the orifice 10 abuts against a shoulder 19 at the bottom of the socket 14 and is tapered so as to project into a gas passage 20 in the vaporizer body 15. The inlet of the orifice 10 is practically at the apex of the tapered inner end of the plug 11, to prevent the clogging of this orifice.

Additional means may be provided to prevent entry of particles of dust and unvaporized liquefied gas into the orifice 10. As shown, screens 21 and 22 of close mesh also adapted to vaporize gas are placed in advance of the entrance of the passage 20 in the vaporizer body 15. The screens 21 and 22 may be held in place by suitable means, and as shown such means may include an improved hose coupling member 24 which has a threaded socket 25 at one end to receive the threaded screen holders 26 and 27 which secure the screens 21 and 22 in the bottom of the socket 25. The bottom side of the screen holder 27 abuts against the inner screen 22 and has gas passages 28 therethrough opening into a slot 29 and a recess 30 in the opposite side of the screen holder. The screen 21 is held against the outer side of the screen holder 27 by the screen holder 26 which has a recess 31 on the side thereof facing the screen 21 and registering with the recess 30 in the holder 27. Gas passages 32 extend through the screen holder 26 from the recess 31 to a slot 33 which opens into the gas passage 20 in the vaporizer body 15. The slots 29 and 33 are adapted to receive the end of a tool such as a screw-driver to facilitate insertion and removal of the screen holders. Solder 35 or suitable means may be employed to provide a gas tight joint between the vaporizer body 15 and the coupling member 24. The plug 16 and the screen holders 26 and 27 form baffles for intercepting the entrained liquid fuel particles and holding them for vaporization by the flowing gas. The screens 21 and 22 also intercept the liquid particles and hold them in the gas current for vaporization.

The vaporizer body may be provided with a shoulder or collar 36 adapted to provide an abutment for the inturned flange 37 of an internally threaded coupling nut 38 swivelled thereon whereby the vaporizer may be secured to the inlet 6 of a blowpipe, for example. The hose coupling member 24 has an externally corrugated or grooved stem 39 which is provided with an axial gas passage 40 enlarged as at 41 where the inner end thereof enters the socket 25.

While the improved vaporizer is shown as embodied in an attachment for blowpipes it will be understood that it may be otherwise incorporated in the fuel gas supply conduit of a blowpipe or other burner without departing from the spirit of this invention, which is therefore not limited to the exact details shown and described.

I claim:

1. The combination with a blowpipe, a container for liquefied fuel gas therefor, a conduit between said container and said blowpipe, means controlled by the pressure in said conduit for regulating the delivery of gas to the conduit at a substantially constant pressure from said container, a vaporizer in said conduit for vaporizing the entrained liquid fuel particles carried through said regulating means by the gas, and means restricting the flow of gas from the vaporizer to the blowpipe, whereby the gas vaporized in the conduit is made effective to check the delivery of gas through said regulating means.

2. The combination with a burner, of a container for liquefied fuel gas, a conduit between said container and said burner, means for delivering gas and entrained liquefied gas at a constant pressure from said container to said conduit, a device in said conduit having a restricted gas passage, and screen means between said delivering means and said restricted gas passage adapted to vaporize liquefied gas and exclude dust from said restricted passage.

3. The combination with a blowpipe, of means for delivering gas at a substantially constant pressure from a supply of liquefied fuel gas, and a gas conduit from said means to said blowpipe including a restricted portion adapted to reduce the pressure of the gas at a substantially constant ratio, and screen means in said conduit in advance of said restricted portion adapted to vaporize liquefied gas and exclude dust from said restricted passage.

4. A pressure-reducing and vaporizing device for blowpipes comprising a body containing a restricted gas passage and screen means adapted to exclude dust from said passage, and means on said body for securing it directly to a blowpipe and for securing a gas hose thereto.

5. An attachment for a blowpipe having separate inlets for oxygen and fuel gas, such attachment having a hose coupling at one end and a swivelled nut at its other end for coupling the attachment directly to a blowpipe at the fuel gas inlet thereof, and a permanently open restricted gas passage in said attachment between the ends thereof.

6. A pressure-reducing and vaporizing device comprising a tubular body, a plug in one end of said body having a central restricted gas passage, dust-excluding and vaporizing means between said plug and the inlet end of said device, and a chamber between said restricted passage and the aforesaid means.

7. The combination with a torch, of means for supplying fuel gas to the torch from a source of liquefied fuel under pressure, a conduit for delivering the gas to the torch, a regulating valve controlling the delivery of gas to the conduit, and a vaporizer in the conduit for vaporizing the entrained liquid carried by the gas, before it reaches the torch, said vaporizer having a restricted passage through which all the gas must flow at high velocity, and substantially flat baffle means directly in line with said restricted passage for intercepting the entrained liquid fuel.

8. The combination with a torch, of means for supplying oxygen and fuel gas to the torch, the latter from a source of liquefied fuel under pressure, a conduit for delivering the fuel gas to the torch, a regulating valve controlling the delivery of gas to the conduit at substantially uniform pressure, and a vaporizer in the conduit comprising a series of expansion chambers, connected by more restricted passages, whereby the gas is alternately accelerated and decelerated as it flows along the conduit, to vaporize the entrained liquid fuel particles before the fuel gas is mixed with the oxygen.

9. The combination with a torch, of means for supplying fuel gas to the torch from a source of liquefied fuel under pressure, a conduit for delivering the fuel gas to the torch, a regulating valve controlling the delivery of gas to the conduit at substantially uniform pressure, and a vaporizer in the conduit comprising a baffle for intercepting liquid fuel particles entrained in the gas, said baffle having openings through which the gas may flow, and a screen extending across the face of the baffle and across said openings, upon which the intercepted liquid may spread to the openings for vaporization by the flowing gas.

10. The combination with a torch, of means for supplying fuel gas to the torch from a source of liquefied fuel under pressure, a conduit for delivering fuel gas to the torch, a regulating valve controlling the delivery of gas to the conduit at substantially uniform pressure, and a vaporizer in the conduit comprising an expansion chamber through which the gas is passed, and a screen stretched across the expansion chamber with its opposite faces exposed to the current of gas, the arrangement being such that the screen may intercept entrained liquid fuel and hold it, and the gas current may pass through a large screen section for vaporizing the liquid.

11. A throttling device for gases containing substances in another phase comprising a conduit and a plug in said conduit, said plug presenting a conical face toward the direction from which said gas flows and having an opening extending through said plug from a part immediately adjacent the vertex of said conical surface.

12. A strainer comprising at least two baffles having concave faces, said baffles being provided with holes extending through said baffles at their concave faces, said baffles being placed with their concave faces opposed and a screen between and engaged by said faces.

In testimony whereof, I affix my signature.

WORTHY C. BUCKNAM.